(12) United States Patent
Saby et al.

(10) Patent No.: US 12,019,760 B2
(45) Date of Patent: Jun. 25, 2024

(54) SYSTEM AND METHOD FOR SECURE MOVEMENT OF TRUSTED MEMORY REGIONS ACROSS NUMA NODES

(71) Applicant: DELL PRODUCTS, LP, Round Rock, TX (US)

(72) Inventors: Vinod Parackal Saby, Bangalore (IN); Krishnaprasad Koladi, Bengaluru (IN); Gobind Vijayakumar, Trichy (IN)

(73) Assignee: Dell Products L.P., Round Rock, TX (US)

( * ) Notice: Subject to any disclaimer, the term of this patent is extended or adjusted under 35 U.S.C. 154(b) by 586 days.

(21) Appl. No.: 17/185,571

(22) Filed: Feb. 25, 2021

(65) Prior Publication Data
US 2022/0269797 A1 Aug. 25, 2022

(51) Int. Cl.
*G06F 21/60* (2013.01)
*G06F 12/0882* (2016.01)
*G06F 21/62* (2013.01)
*H04L 9/32* (2006.01)

(52) U.S. Cl.
CPC ........ *G06F 21/602* (2013.01); *G06F 12/0882* (2013.01); *G06F 21/62* (2013.01); *H04L 9/3242* (2013.01); *G06F 2212/1052* (2013.01); *G06F 2221/2149* (2013.01)

(58) Field of Classification Search
CPC .... G06F 21/602; G06F 12/0882; G06F 21/62; G06F 2212/1052; G06F 2221/2149; H04L 9/3242
USPC ......................................................... 713/190
See application file for complete search history.

(56) References Cited

U.S. PATENT DOCUMENTS

| | | | |
|---|---|---|---|
| 10,268,612 B1 * | 4/2019 | Bshara | G06F 3/061 |
| 10,728,230 B2 | 7/2020 | Lawson et al. | |
| 10,824,524 B2 | 11/2020 | Koladi et al. | |
| 2011/0173622 A1 * | 7/2011 | Shin | G06F 9/4856 718/102 |
| 2016/0070598 A1 * | 3/2016 | Vadkerti | G06F 9/5077 718/104 |
| 2016/0246540 A1 * | 8/2016 | Blagodurov | G06F 12/1081 |
| 2017/0054557 A1 * | 2/2017 | Rozas | H04L 63/10 |
| 2017/0168715 A1 * | 6/2017 | Eshwarappa | G06F 9/45558 |
| 2018/0114013 A1 * | 4/2018 | Sood | G06F 21/606 |
| 2020/0319948 A1 | 10/2020 | Singh et al. | |
| 2020/0356672 A1 | 11/2020 | Paulraj et al. | |
| 2021/0019166 A1 * | 1/2021 | Kataria | G06F 9/45558 |
| 2021/0248000 A1 * | 8/2021 | Hadas | G06F 9/45558 |

(Continued)

*Primary Examiner* — Dereena T Cattungal
(74) *Attorney, Agent, or Firm* — Larson Newman, LLP

(57) ABSTRACT

An information handling system includes a first memory having a trusted memory region, wherein the trusted memory region is an area of execution that is protected from processes running in the information handling system outside the trusted memory region. A secure cryptographic module may receive a request to create the trusted memory region from a dependent application, and create a mapping of the trusted memory region along with an enhanced page cache address range mapped to a non-uniform memory access (NUMA) node. The module may also detect a NUMA migration event of the dependent application, identify the trusted memory region corresponding to the NUMA migration event, and migrate the trusted memory region from the NUMA node to another NUMA node.

18 Claims, 5 Drawing Sheets

(56) References Cited

U.S. PATENT DOCUMENTS

2021/0306304 A1\* 9/2021 Hwang .................... G06F 21/10
2022/0129591 A1\* 4/2022 K. ........................... G06F 21/72
2022/0206700 A1\* 6/2022 Ng .......................... G06F 3/061

\* cited by examiner

SYSTEM AND METHOD FOR SECURE MOVEMENT OF TRUSTED MEMORY REGIONS ACROSS NUMA NODES

FIELD OF THE DISCLOSURE

The present disclosure generally relates to information handling systems, and more particularly relates to secure movement of trusted memory regions across non-uniform memory access (NUMA) nodes.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a first memory having a trusted memory region, wherein the trusted memory region is an area of execution that is protected from processes running in the information handling system outside the trusted memory region. A secure cryptographic module may receive a request to create the trusted memory region from a dependent application, and create a mapping of the trusted memory region along with an enhanced page cache address range mapped to a non-uniform memory access (NUMA) node. The module may also detect a NUMA migration event of the dependent application, identify the trusted memory region corresponding to the NUMA migration event, and migrate the trusted memory region from the NUMA node to another NUMA node.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
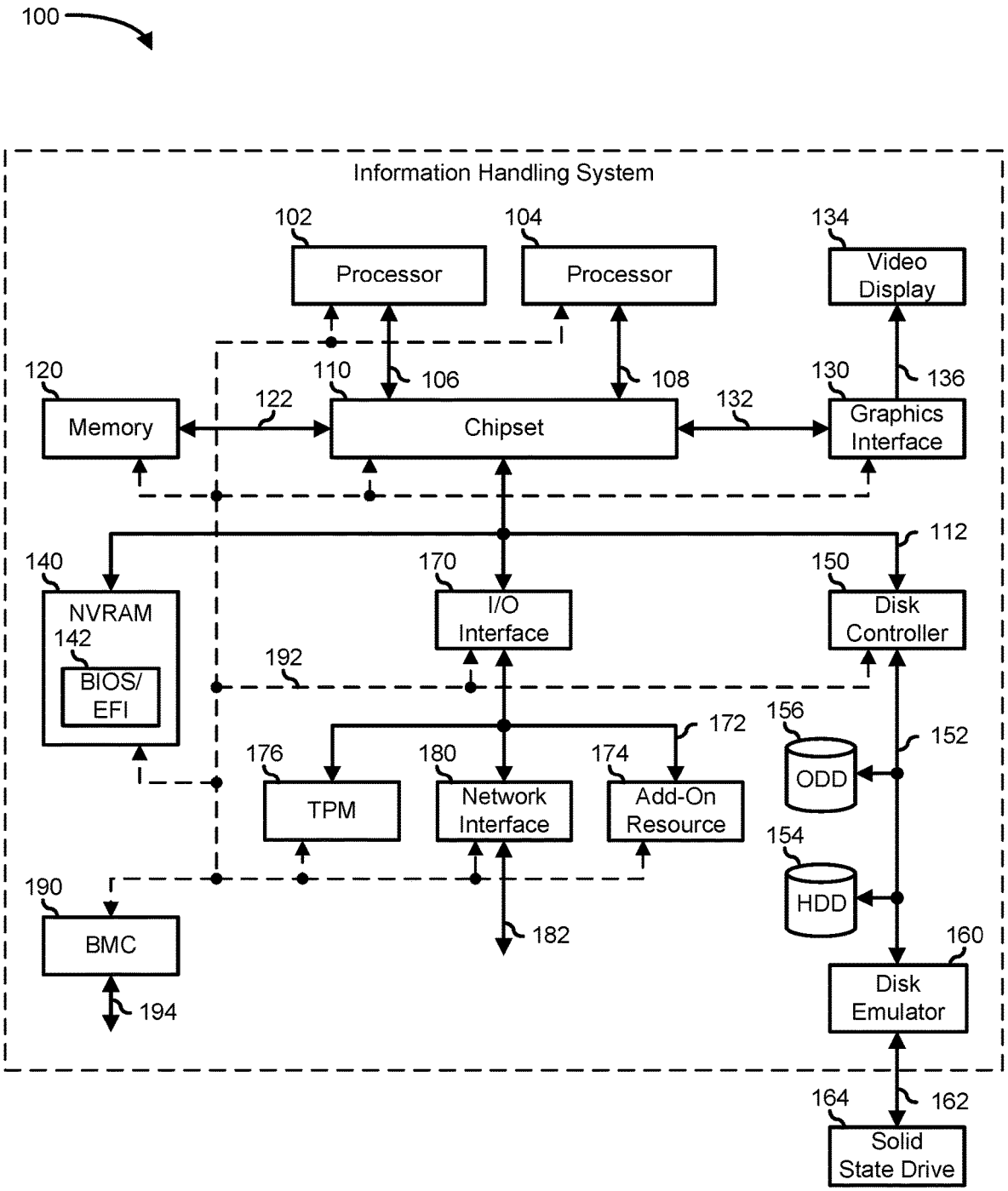
FIG. 1 is a block diagram illustrating an information handling system, according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Typically, operating systems support the run time movement of processes between non-uniform memory access (NUMA) nodes to optimize the performance of workloads. The processes may be moved across NUMA nodes in the same CPU or across CPUs to optimize CPU performance. In such a case protection of a trusted region of memory, also referred to as a trusted memory region, a private memory region, a private region, or an enclave, is implemented using various mechanisms such as when Intel® software guard extension (SGX) is enabled. A trusted memory region is an area of execution that is protected from processes running in an information handling system outside the trusted memory region.

If the process being moved has the trusted memory region associated with the process, then the movement of the process has to take care of also moving the trusted memory region along with code and/or data stored therein. Otherwise, the security associated with the process and/or tursted memory region in addition to the code and/or data stored therein may be lost. This may happen because the operating system is generally not aware of the address range of the trusted memory ranges. For example, where the SGX is implemented, an enclave page cache (EPC) address range is generally invisible to the operating system, a NUMA scheduler is unaware of the enclave. As such, the NUMA scheduler would not be able to migrate the enclave. This scenario makes NUMA balancing inefficient.

In addition, the allocation of trusted memory region may be inefficient if the assignment of trusted memory regions to an address range in the memory is performed without considering the affinity of the aforementioned trusted memory regions to other trusted memory regions associated with the same application or virtual machine. This leads to inefficient allocation of trusted memory regions and hence performance would not be optimal. When the protection of the trusted memory regions is enabled, BIOS reserves a contiguous memory address ranges for trusted memory regions. However, different operating system schedulers allocate virtual address space for processes without checking interdependency of child processes and trusted memory region usage resulting in inefficient allocation of trusted memory regions for a given process, such as for distributed applications where processes are dependent on each other. To address the aforementioned and other issues, the present disclosure provides a mechanism to perform automatic seamless NUMA balancing of protection enabled processes/threads and securely move the trusted memory region associated with them across NUMA nodes.

Figure 2:
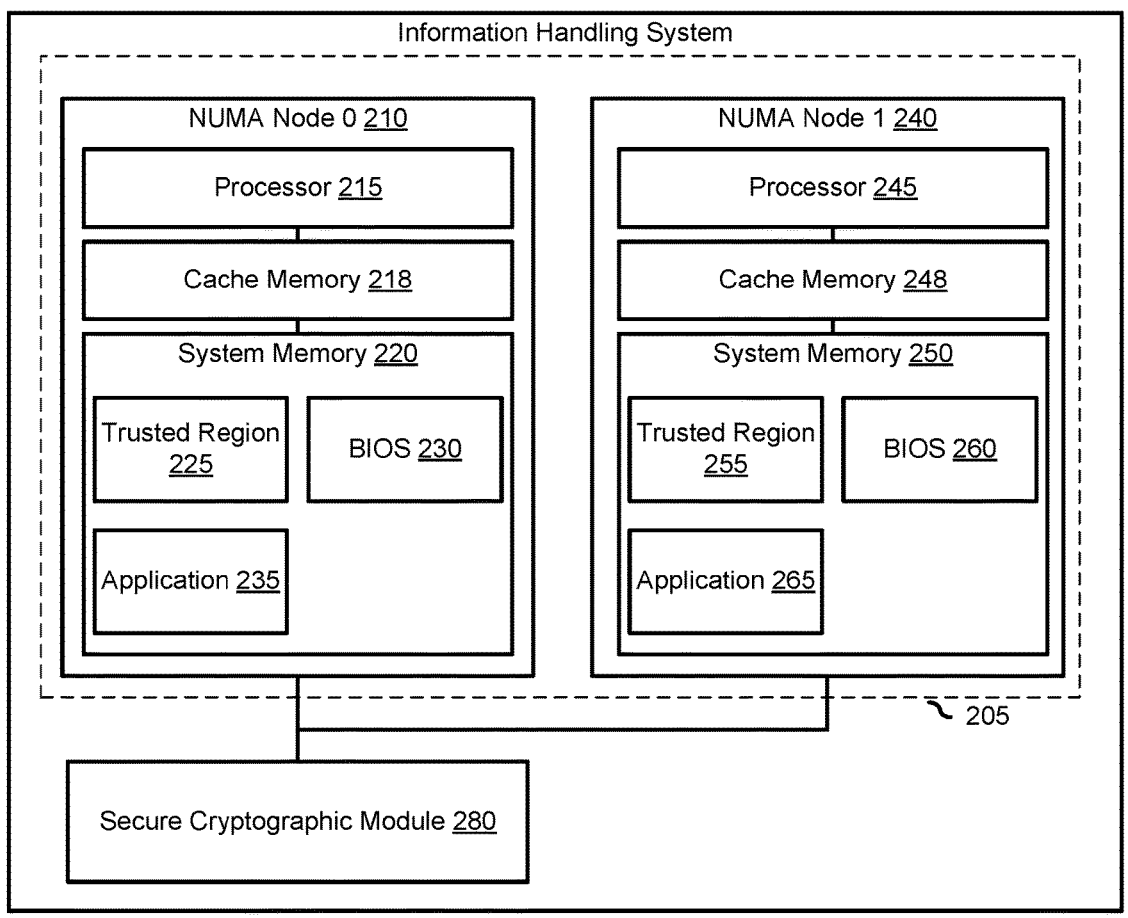
FIG. 2 is a block diagram illustrating an information handling system for a secure movement of trusted memory regions across non-uniform memory access (NUMA) nodes, according to an embodiment of the present disclosure.

FIG. 2 illustrates an example of an information handling system 200 for the secure movement of trusted memory regions across NUMA nodes in a multi-socket system. For example, information handling system 200 provides support for the secure movement of SGX enclaves across NUMA nodes in multi-socket systems. Information handling system 200, which is similar to information handling system 100 of FIG. 1, includes a NUMA node 0 210, a NUMA node 1 240, and a secure cryptographic module 280. NUMA node 0 210 and NUMA node 1 240 are interconnected such that the nodes share memory and I/O resources. NUMA node 0 210 includes a processor 215, a cache memory 218, and a system memory 220. System memory 220 includes a trusted region 225, a BIOS 230, and an application 235. NUMA node 1 240 includes a processor 245, a cache memory 248, and a system memory 250. System memory 250 includes a trusted region 255, a BIOS 260, and an application 265. The above and other components of information handling system 200 may be implemented in hardware, software, firmware, or any combination thereof NUMA node 0 210 can include more than one, that is multiple, processors. Here, processor 215 is coupled to cache memory 218 which is coupled to system memory 220. NUMA node 1 240 can include more than one, that is multiple, processors. Here, processor 245 is coupled to cache memory 248 which is coupled to system memory 250. NUMA node 0 210 and NUMA node 1 240 are interconnected via a system interconnect 205. System interconnect 205 can be interchangeably referred to as a system bus. System memory 220 and system memory 250 are communicatively connected via system interconnect 205 such that processor 215 can access system memory 250 and processor 245 can access system memory 220.

System memory 220 can include one or more software and/or firmware modules in addition to BIOS 230 and application 235. System memory 250 can include one or more software and/or firmware modules in addition to BIOS 260 and application 265. The one or more software and/or firmware modules within system memory 220 can be loaded into processors 215 and 245 during the operation of information handling system 200. The one or more software and/or firmware modules with system memory 250 can be loaded into processors 215 and 245 during the operation of information handling system 200.

Trusted region 225 and trusted region 255 are protected areas of execution from processes running in the information handling system 200 outside the untrusted memory regions of system memory 220 and system memory 250. Trusted region 225 and trusted regions 255 can be used to isolate data from other users, the operating system, virtual machine, or hypervisor. In one example, trusted region 225 and trusted region 255 includes an enclave.

Secure cryptographic module 280 may be configured to provide a mechanism to allocate memory for trusted region 225 and trusted region 255 by considering their affinity with existing trusted memory regions of dependent applications. This improves the overall performance of information handling system 200 by grouping dependent processes or applications and assigning them with a trusted memory region under the same NUMA node. This assignment may be performed during the creation of the trusted memory region. In one example, secure cryptographic module 280 provides a mechanism to allocate memory for enclaves based on their affinity with existing enclaves of dependent applications. Secure cryptographic module 280 may also be configured to provide an efficient and dynamic movement of trusted memory regions based on the movement of dependent processes or applications across NUMA nodes. Secure cryptographic module 280 may be implemented using various mechanisms such as with Intel SGX, Arm® Ltd. TrustZone, Advanced Micro Devices®, Inc. (AMD) secure encrypted virtualization, etc.

As part of the mechanism outlined above, an administrator may tag dependent applications, as part of a distributed application stack, to ensure that the dependent applications are executed as close as possible. Typically, if the distributed application runs in the same physical system, the NUMA scheduling algorithm runs the dependent applications in the same NUMA node to reduce latency. However, there may be instances that trusted memory regions, such as SGX enclaves, spawned from the dependent applications may be created in another socket or NUMA node. In one example, a distributed application may be memory intensive such that there are constant memory-related transactions between untrusted code and trusted code. A latency may occur if the untrusted code address ranges are run from one NUMA node and the trusted memory region code address, such as EPC address ranges. In one example, secure cryptographic module 280 may be configured to provide a mechanism for SGX enclaves to be run closer to the application's untrusted runtime code and data.

The present disclosure may be implemented in two parts. The first part is an optimal initial placement of the trusted memory region or enclave, wherein the trusted and untrusted memory region for an application is created close to each other, that is in the same or adjacent NUMA node. For example, the EPC address range selected when creating the enclave may be closer to the NUMA node where the untrusted portion of the application is pinned to. Here, trusted region 225 may be associated with application 235. A trusted memory region for a depedent application of application 235 may be created in NUMA node 0 210. Similarly, trusted region 255 may be associated with application 265. A trusted memory region for a depedent application of application 265 may be created in NUMA node 1 240.

The second part may be used to trigger NUMA optimization for distributed applications such as the dependent applications trusted and untrusted memory regions are moved closer to each other. A runtime decision-making process may be provided to determine whether to move the trusted memory region or SGX enclave along with the processes' untrusted runtime code and data to be closer together. For example, if a trusted memory region of a dependent application of application 235 is located at NUMA node 1 240, then the trusted memory region of the dependent application may be moved to NUMA node 0 210 where trusted region 225 of application 235 is located.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. Although the examples herein uses the SGX implementation, the present disclosure may be implemented using other mechanisms. In addition, the depicted examples do not convey or imply any architectural or other limitations with respect to the presently described embodiments and/or the general disclosure. In the discussion of the figures, reference may also be made to components illustrated in other figures for continuity of the description.

Figure 3:
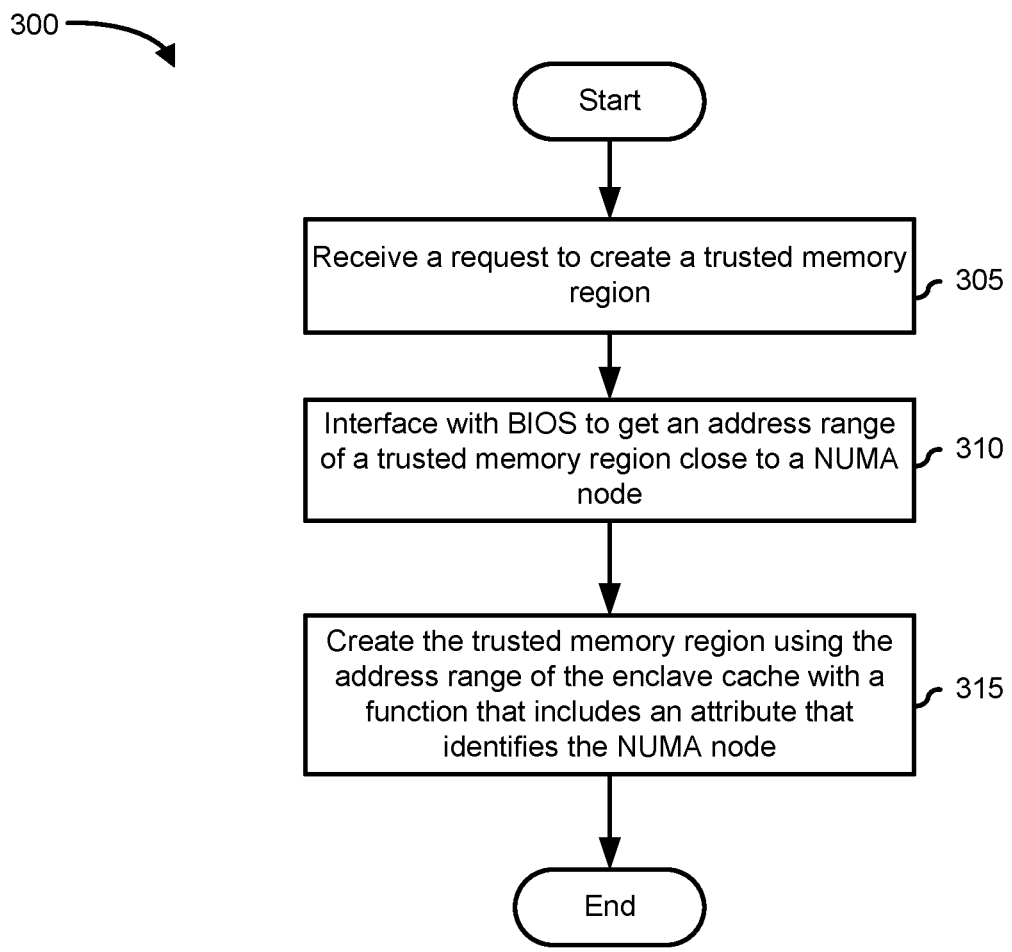
FIG. 3 is a flowchart illustrating a method for grouping trusted and untrusted memory regions of a trusted application, according to an embodiment of the present disclosure.

FIG. 3 shows a flowchart of an example method 300 for grouping trusted and untrusted memory regions of a trusted application and/or its dependents. The trusted and untrusted memory regions include trusted and untrusted code and/or data, wherein the trusted and untrusted memory regions are located in the same or adjacent NUMA nodes. In particular, a secure cryptographic module such as secure cryptographic module 280 of FIG. 2 may perform method 300. While embodiments of the present disclosure are described in terms of information handling system 200 of FIG. 2, it should be recognized that other systems may be utilized to perform the described method.

One type of information handling system is a NUMA server. A NUMA server is implemented as a plurality of server "nodes" where each node includes one or more processors and system memory that is "local" to the node. The nodes are interconnected so that the system memory on one node is accessible to the processors on the other nodes. Processors are connected to their local memory by a local bus. Processors connect to remote system memories via the NUMA interconnect. The local bus is shorter and faster than the NUMA interconnect so that the access time associated with processor access to local memory or local access is less than the access time associated with processor access to remote memory or remote access.

For example, if an untrusted portion of code and/or data is mapped to a physical address range which is part of NUMA node zero, the present system and method may create a trusted memory region for a trusted portion of the code and/or the data, using an address range that is closer to NUMA node zero. In particular, if a security mechanism is implemented using SGX, the present system and method may create an SGX enclave using an EPC address range closer to NUMA node zero.

Method 300 typically starts at block 305 where it receives a request to create a trusted memory region. The request may include an attribute that includes the number of a NUMA node, wherein the trusted memory region may be created. The method proceeds to block 310.

At block 310, the method interfaces with the BIOS function associated with operating system capabilities, such as the "_OSC" method, to get an EPC address range that is close to the specified NUMA node in the request. An operating system driver, such as an SGX driver, that interfaces with the BIOS may be modified to accept the number of the NUMA node and determine an address range, such as an EPC address range closer to the NUMA node. The method proceeds to block 315.

At block 315, the trusted memory region may be created based on the EPC address range determined in block 310. In particular, an "ECREATE" command may be used to set up the trusted memory region. The ECREATE command includes an additional API attribute that identifies the NUMA node that the trusted memory region or enclave is pinned to. The method may use a NUMA programming interface, such as the "libnuma" library that is supported by the Linux® programming interface. Each enclave is associated with an SGX enclave control structure (SECS). The SECS includes metadata information associated with the enclave such as the size and hash used. After creating the trusted memory region close to a specified NUMA node, the method ends.

Figure 4:
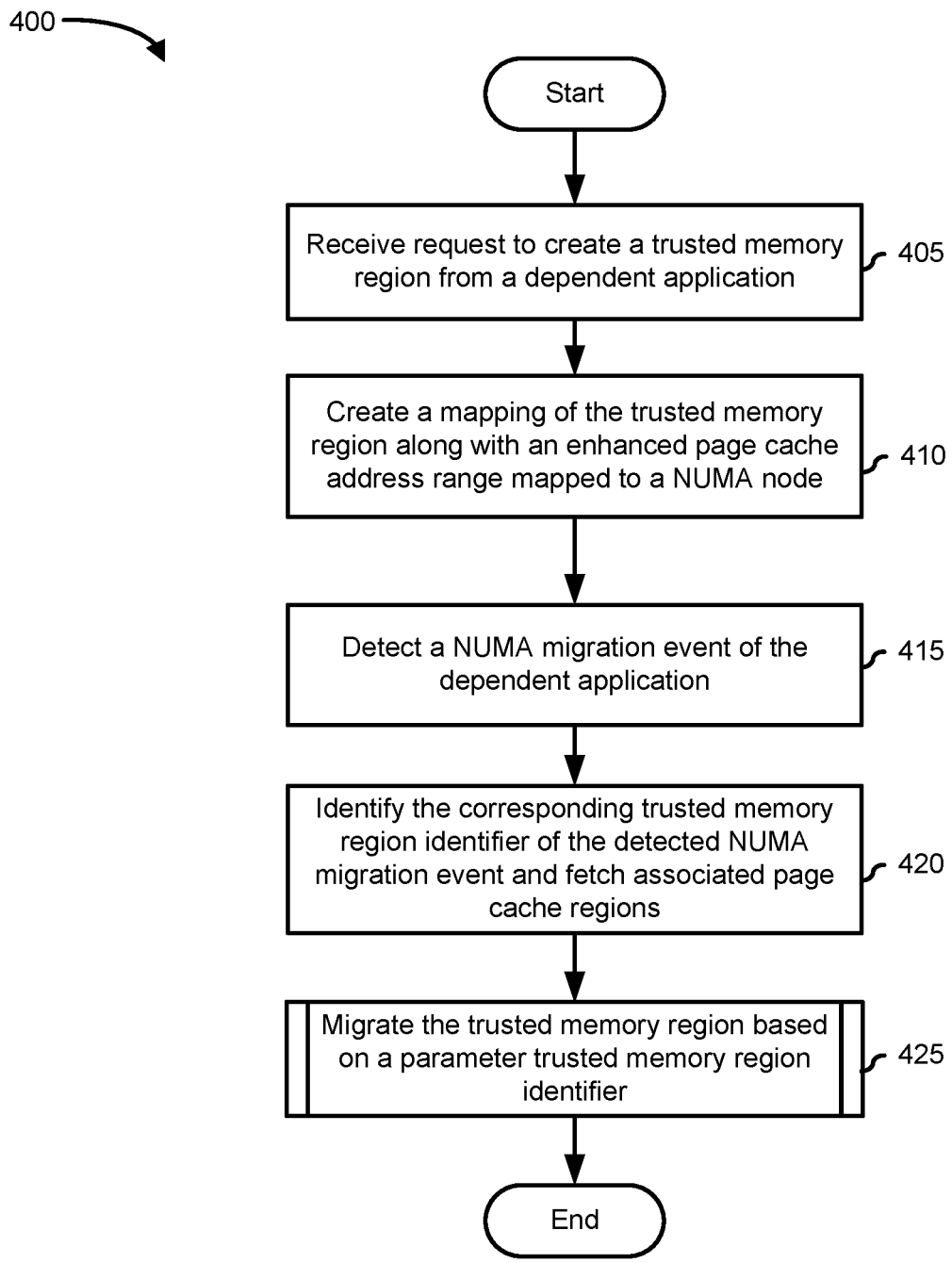
FIG. 4 is a flowchart illustrating a method for secure movement of trusted memory regions across NUMA nodes, according to an embodiment of the present disclosure.

FIG. 4 shows a flowchart of an example method 400 for providing an efficient and dynamic movement of trusted memory regions based on the dependent processes' movement across NUMA nodes. Method 400 may be performed by a custom device driver such as secure cryptographic module 280 of FIG. 2. The custom device driver is subscribed to NUMA migration events. While embodiments of the present disclosure are described in terms of information handling system 200 of FIG. 2, it should be recognized that other systems may be utilized to perform the described method.

In one embodiment, method 400 may be used to perform runtime migration of SGX enclaves across NUMA nodes for distribution dependent applications. When an SGX enabled process or thread is to be moved across NUMA nodes, method 400 identifies the SGX enclave to be moved, considers the SGX configuration, and meets pre-requisites including the availability of an EPC region based on processor reserved memory range (PRMRR). The pre-requisites may differ based on the SGX configuration. Accordingly, method 400 performs a secure movement of relevant enclaves along with processes and/or their unprotected data in an unprotected or untrusted memory region.

Method 400 typically starts at block 405, where the method may receive a request to spawn a new trusted memory region from a dependency of an application currently running. The method proceeds to block 410 where subsequent to the receipt of the request, the method creates a mapping of a trusted memory region identifier with the address range of the trusted memory region and the NUMA node. For example, when a dependent application spawns a new enclave, the custom device driver creates a mapping of enclave identifier (EID) along with the EPC address range mapped NUMA node as shown in table 1 below. The mapping may be based on an application and include dependency information. For example, if the security mechanism is implemented using SGX, the mapping may include an application with an associated EID, the SGX SECS, a NUMA node, and dependencies of the application.

TABLE 1

| Trusted Region Mapping | | | |
|---|---|---|---|
| Application Identifier | Trusted Region Identifier | NUMA Node | Dependency Identifier |
| A | 123456A | 0 | ABC123; XYZ456 |
| B | 234567A | 0 | 123ABCD |
| C | 345678C | 1 | 123ABCD |

The trusted memory region mapping table includes information associated with memory location and dependencies of an application. For example, the trusted memory region mapping table includes an application identifier, a trusted region identifier, a NUMA node, and one or more dependency identifiers. The trusted region identifier along with the NUMA node may be used to determine the location of the trusted memory region where the application is loaded. The trusted region identifier may include information such as an address range mapped to the NUMA node. For example, the trusted region identifier may be an EID with an SGX SECS identifier that includes metadata associated with each enclave, such as an EPC address range mapped to the NUMA node. The SECS are tagged with a type that identifies pages that hold the SECS. The dependency identifier column identifies the dependent applications. The method proceeds to block 415.

At block 415, the method monitors for NUMA migration events from the application and/or its dependent application. At one point, the method detects a NUMA migration event from the dependent application. The method proceeds to block 420 where the method may identify the corresponding trusted memory region identifier of the detected NUMA migration event and fetches the page cache. In particular, the custom device driver may identify the corresponding EIDs and fetches the EPC regions using a method associated with retrieving operating system capabilities via the BIOS. The method proceeds to block 425.

At block 425, the method invokes a method to migrate the trusted memory region from one NUMA node to another NUMA node. The method may identify the trusted memory region and associated NUMA node corresponding to the NUMA migration event based on an identifier provided as a parameter. The method may determine whether to migrate the trusted memory region prior to performing the migration. In one example, the method may invoke an SGX instruction "EMIGRATE NUMA" and provide an EID as a parameter.

Figure 5:
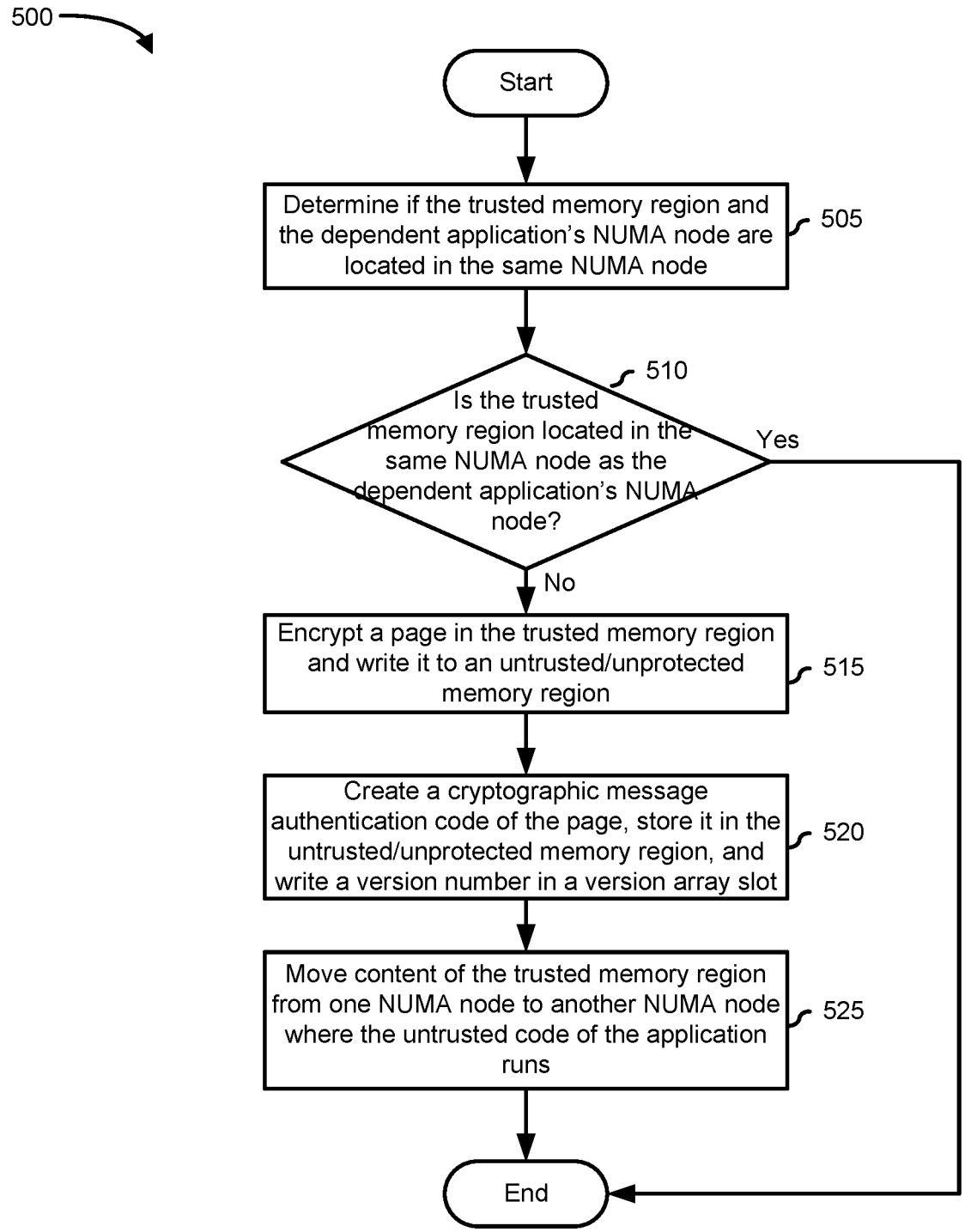
FIG. 5 is a flowchart illustrating a method for a secure movement of trusted memory regions across NUMA nodes, according to an embodiment of the present disclosure.

FIG. 5 shows a flowchart of an example method 500 for migrating a trusted memory region. Method 500 is a detailed illustration of block 420 of method 400. Method 500 may be performed by a custom device driver, such as secure cryptographic module 280 of FIG. 2. While embodiments of the present disclosure are described in terms of information handling system 200 of FIG. 2, it should be recognized that other systems may be utilized to perform the described method.

Method 500 typically starts at block 505 where the method assesses if the trusted memory region and the dependent application's NUMA node are located in the same NUMA node. In one example, the custom device driver assesses if the EPC and the dependent application's NUMA node are located in the same NUMA node. The method proceeds to decision block 510.

At decision block 510, if the trusted memory region is located in the same NUMA node as the dependent application's NUMA node, then the "YES" branch is taken and the method ends. If the trusted memory region is not located in the same NUMA node as the dependent application's NUMA node, then the "NO" branch is taken and the method proceeds to block 515.

At block 515, the method may encrypt a page in the trusted memory region and store it in an unprotected region in the memory. In one example, an SGX secure write back (EWB) instruction may be used to encrypt a page in the EPC and writes it to an unprotected region of the memory. The method proceeds to block 520.

At block 520, the method may create a cryptographic message authentication code of the memory page and store it in the unprotected and then writes identifier information such as a version in number in a version array slot. In one example, an SGX EWB instruction performs block 520. The method proceeds to block 525.

At block 525, the method may move the content of the trusted memory region from one NUMA node to another NUMA node where the untrusted code is running. In one example, the method may invoke SGX remote attestation workflow to move an EPC page content from the source NUMA node to a destination where the application's untrusted code runs.

Although FIG. 3, FIG. 4, and FIG. 5 show example blocks of method 300, method 400, and method 500 in some implementation, method 300, method 400, and method 500 may include additional blocks, fewer blocks, different blocks, or differently arranged blocks than those depicted in FIG. 3, FIG. 4, and FIG. 5. Additionally, or alternatively, two or more of the blocks of method 300, method 400, and method 500 may be performed in parallel. For example, block 310 and block 315 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
receiving, by a processor, a request to create a trusted memory region from a dependent application;
creating a mapping of the trusted memory region along with an enhanced page cache address range mapped to a non-uniform memory access (NUMA) node;
detecting a NUMA migration event of the dependent application; and
subsequent to the detecting the NUMA migration event, identifying the trusted memory region corresponding to the NUMA migration event, and migrating the trusted memory region from the NUMA node to another NUMA node that includes:
in response to determining that the trusted memory region and the NUMA node are not located in same NUMA node, encrypting a page in the trusted memory region and writing the page in an unprotected memory region; and
moving content of the trusted memory region from the NUMA node to the unprotected memory region in the another NUMA node.

2. The method of claim 1, wherein the trusted memory region is a protected area of execution.

3. The method of claim 1, further comprising fetching page cache regions associated with the trusted memory region.

4. The method of claim 1, wherein the migrating of the trusted memory region is based on a trusted memory region identifier.

5. The method of claim 1, further comprising determining whether the NUMA node mapped to the trusted memory region and the another NUMA node mapped to the dependent application are same.

6. The method of claim 1, further comprising invoking Intel software guard extensions workflow.

7. The method of claim 6, further comprising creating a cryptographic message authentication code of the page and storing the cryptographic message authentication code in the unprotected memory region.

8. An information handling system, comprising:
a first memory including a trusted memory region, wherein the trusted memory region is an area of execution that is protected from processes running in the information handling system outside the trusted memory region; and
a secure processor configured to:
receive a request to create the trusted memory region from a dependent application;
create a mapping of the trusted memory region along with an enhanced page cache address range mapped to a non-uniform memory access (NUMA) node;
detect a NUMA migration event of the dependent application; and
subsequent to detection of the NUMA migration event, identify the trusted memory region corresponding to the NUMA migration event, and migrate the trusted memory region from the NUMA node to another NUMA node that includes:
in response to determining that the trusted memory region and the NUMA node are not located in same NUMA node, encrypting a page in the trusted memory region and writing the page in an unprotected memory region; and
moving content of the trusted memory region from the NUMA node to the unprotected memory region in the another NUMA node.

9. The information handling system of claim 8, wherein the secure processor includes Intel software guard extensions instructions.

10. The information handling system of claim 8, wherein the secure processor is further configured to interface with BIOS to get an address range of the trusted memory region.

11. The information handling system of claim 8, wherein the secure processor is further configured to create the trusted memory region in the NUMA node.

12. The information handling system of claim 8, wherein the secure processor is further configured to use an ECREATE command that includes an API attribute identifying the NUMA node.

13. A non-transitory computer-readable medium including code that when executed performs a method, the method comprising:
receiving a request to create a trusted memory region from a dependent application;
creating a mapping of the trusted memory region along with an enhanced page cache address range mapped to a non-uniform memory access (NUMA) node;
detecting a NUMA migration event of the dependent application; and
subsequent to the detecting the NUMA migration event, identifying the trusted memory region corresponding to the NUMA migration event, and migrating the trusted memory region from the NUMA node to another NUMA node that includes:
in response to determining that the trusted memory region and the NUMA node are not located in same NUMA node, encrypting a page in the trusted memory region and writing the page in an unprotected memory region; and
moving content of the trusted memory region from the NUMA node to the unprotected memory region in the another NUMA node.

14. The non-transitory computer-readable medium of claim 13, wherein the trusted memory region is a protected area of execution.

15. The non-transitory computer-readable medium of claim 13, wherein the method further comprising fetching associated page cache regions.

16. The non-transitory computer-readable medium of claim 13, wherein the migrating the trusted memory region is based on a trusted memory region identifier.

17. The non-transitory computer-readable medium of claim 13, wherein the method further comprising determining whether the NUMA node mapped to the trusted memory region and the another NUMA node mapped to the dependent application are same.

18. The non-transitory computer-readable medium of claim 13, wherein the method further comprising creating a cryptographic message authentication code of a memory page and storing the cryptographic message authentication code in the unprotected memory region.

* * * * *